US008760684B2

(12) United States Patent
Feng et al.

(10) Patent No.: US 8,760,684 B2
(45) Date of Patent: Jun. 24, 2014

(54) STACKING PRINT JOBS BEFORE FINAL PRINT

(75) Inventors: Ann Qiongying Feng, San Jose, CA (US); Xiaonong Zhan, Foster City, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 604 days.

(21) Appl. No.: 12/495,083

(22) Filed: Jun. 30, 2009

(65) Prior Publication Data

US 2010/0328704 A1 Dec. 30, 2010

(51) Int. Cl.
*G06F 3/12* (2006.01)
(52) U.S. Cl.
USPC .......................................... 358/1.15; 358/450
(58) Field of Classification Search
USPC .................................................. 358/1.1–1.16
See application file for complete search history.

(56) References Cited

U.S. PATENT DOCUMENTS

| 6,965,440 B1* | 11/2005 | Nakagiri et al. | 358/1.12 |
| 2005/0179926 A1* | 8/2005 | Nishikawa et al. | 358/1.13 |
| 2007/0002350 A1* | 1/2007 | Tyrell | 358/1.13 |

* cited by examiner

*Primary Examiner* — Benny Q Tieu
*Assistant Examiner* — Michael Y Tzeng
(74) *Attorney, Agent, or Firm* — Buchanan Ingersoll & Rooney P.C.

(57) ABSTRACT

A system for producing continuous print jobs, which includes a printing unit which prints an image and a client computer having executable instructions for creating a print job for producing a continuous print job. The executable instructions include activating a continuous print mode from a list of print properties within a printer driver user interface, and wherein the continuous print mode stacks at least two print jobs in a print job queue until instructed to print; sending at least two print jobs to the print job queue; selecting a final print format for each of the at least two print jobs; processing and formatting each of the at least two print jobs into a single combined print job; and printing the single combined print job. The printing unit and the client computer are connected via a network and/or direct connection.

19 Claims, 4 Drawing Sheets

STACKING PRINT JOBS BEFORE FINAL PRINT

FIELD OF THE INVENTION

The present invention relates to a system, a method and a computer readable medium, which stacks at least two print jobs within a job queue until final printing is selected, and prints the stacked print jobs in a single combined print job.

BACKGROUND OF THE INVENTION

A conventional printer driver typically starts a new job on a new sheet of paper, regardless of the blank space and/or side (i.e., back side of a sheet of paper or medium in two-sided printing) left on the previous printing job. In addition, the printer driver also does not consider the space needed and/or available for the current job. In some circumstances, this makes an inefficient utilization of the paper resource.

Thus, it would be desirable to reduce the waste and save the environment, since paper and other print mediums are typically produced from a limited natural resource. Accordingly, it would be desirable to make a printer and/or printer driver user interface that saves the environment and minimizes paper waste. It can be appreciated that for some uses, it is necessary to print each job separately. However, many print jobs actually can benefit from being printed and/or finished together, which would not only save paper, but can also help organize material in a better format. For example, when traveling, it may be necessary to print a hotel reservation and a map. Normally these two jobs will be printed on two separate sheets. However, if the two print jobs are combined into a single print job, then one side of the sheet of paper or medium can have the hotel reservation and the other side of the sheet can include the map. The combined print job not only makes it easier to locate the information, but is also more convenient to carry.

OBJECTS AND SUMMARY

In consideration of the above issues, a print driver is disclosed, which can achieve the above savings by adding an extra selection and/or selections in the printer driver user interface (UI), and wherein if the continuous print mode or print stacking mode (i.e., paper save mode) is selected or used, all of the print jobs are stacked until a final printing is selected. Once the final printing is selected, each of the stacked or queued print jobs are printed and/or finished in a single combined print job.

In accordance with an exemplary embodiment, a system for producing continuous print jobs comprises: a printing unit which prints an image; and a client computer having executable instructions for creating a print job for producing a continuous print job, the instructions comprising: activating a continuous print mode from a list of print properties within a printer driver user interface, and wherein the continuous print mode stacks at least two print jobs in a print job queue until instructed to print; sending at least two print jobs to the print job queue; selecting a final print format for each of the at least two print jobs; processing and formatting each of the at least two print jobs into a single combined print job; and printing the single combined print job on the printing unit.

In accordance with another exemplary embodiment, a method for stacking print jobs, the method comprises: sending at least two print jobs to a print job queue; selecting a final print format for each of the at least two print jobs; processing and formatting each of the at least two print jobs into a single combined print job; and printing the single combined print job.

In accordance with a further exemplary embodiment, a computer readable medium containing a computer program for creating a print job, wherein the computer program comprises computer executable instructions for: activating a continuous print mode from a list of print properties within a printer driver user interface, wherein the continuous print mode stacks at least two print jobs in a print job queue until instructed to print; sending at least two print jobs to the print job queue; selecting a final print format for each of the at least two print jobs; processing and formatting each of the at least two print jobs into a single combined print job; and printing the single combined print job.

In accordance with an exemplary embodiment, the stacked print jobs can be from different applications, such that each and every print job does not need to originate from the same application and/or software application, i.e., Word®, Outlook®, web browser, etc.

In accordance with another exemplary embodiment, the systems and method described herein can append the new print job to the blank area that left from the previous job and/or starting the new print job on the blank side that left from the previous print job.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
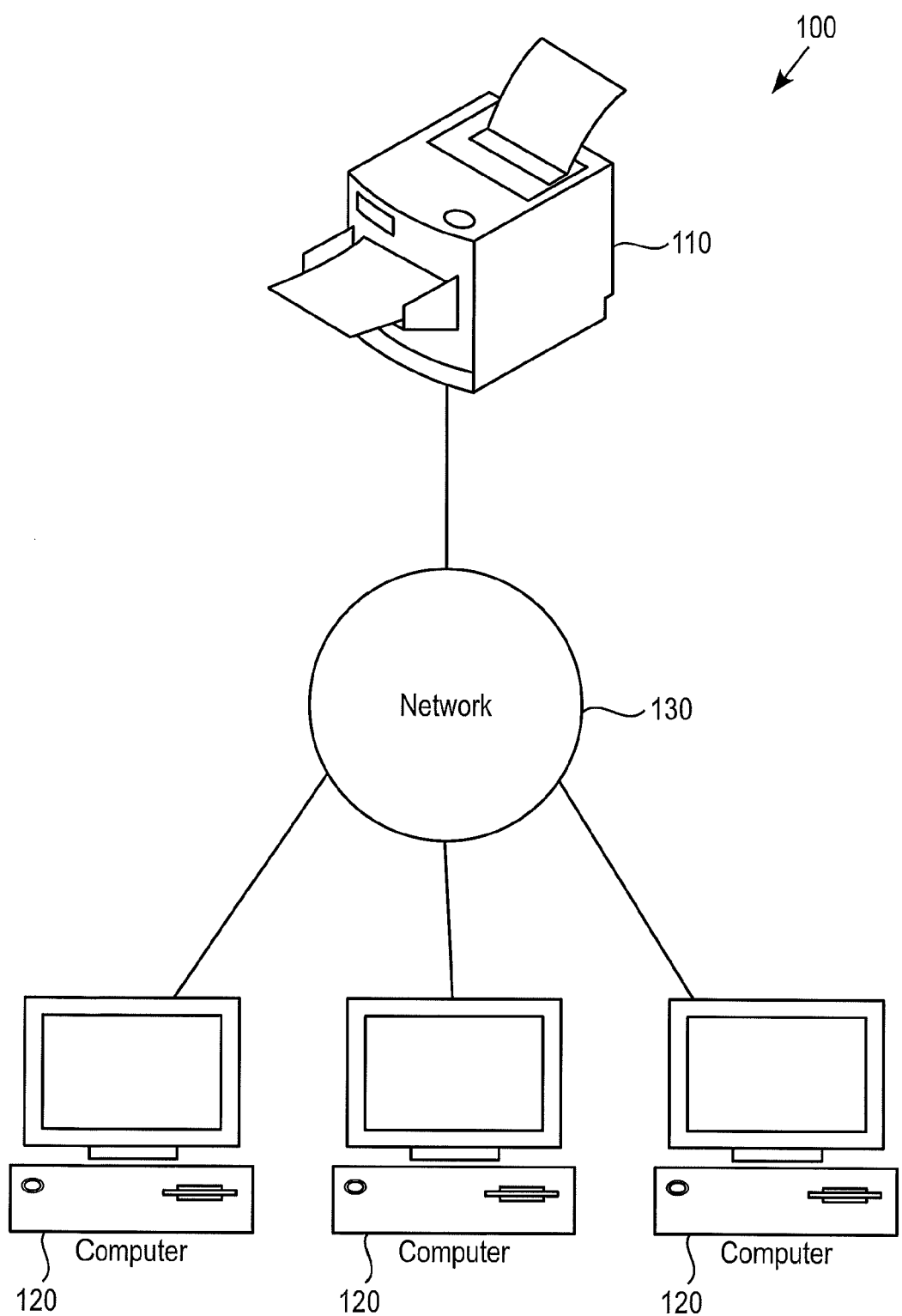
FIG. 1 is a diagram of a network printing system in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a diagram of a network printing system 100 for stacking print jobs before final print in accordance with an exemplary embodiment. As shown in FIG. 1, the system 100 includes a printing unit, i.e., printer (or image forming unit) 110 and a client computer (or client device) 120, which are connected to each other via a network 130 (e.g., LAN or WAN). In accordance with an exemplary embodiment, the client computer 120 includes executable instructions for stacking at least two and/or a plurality of print jobs before final printing. In accordance with an exemplary embodiment, the printer (or image forming unit) 110 receives the print job from the client computer 120, which includes at least two print jobs, which are subsequently combined into a single print job. The single print job is then printed onto at least one sheet of paper and/or other printable medium.

Examples of the network 130 consistent with embodiments of the invention include, but are not limited to, the Internet, an intranet, a local area network (LAN) and a wide area network (WAN). The printer 110 and the client computer 120 can be connected with a wire or be connected with a wireless connection by using radio frequency (RF), infrared (IR) transmission, USB, IEEE 1284, IEEE1394 and/or other suitable wireless technology.

In accordance with an exemplary embodiment, the client computer 120 includes an operating system (OS), application software and printer driver software. The printer driver software controls the printer 110 connected with the client computer 120 in which the printer driver software is installed. In certain embodiments, the printer driver software produces a print job based on an image and/or document data. In certain embodiments, the printer driver software can control transmission of the print job from the client computer 120 to the printer 110.

In accordance with an exemplary embodiment, the client computer 120 produces the print job based on the image and/or the document data and sends the print job to the printer 110. Users of the client computer 120 can produce the image and/or create the print job, which is sent to the printer 110 via the network 130. Examples of the client computer 120 consistent with certain embodiments of the invention include, but are not limited to, a personal computer (or PC) and a personal digital assistance (PDA). The client computer 120 preferably includes a processing unit, a storing unit, a display unit, an input unit and a transmit unit.

It can be appreciated that in accordance with an exemplary embodiment, the processing unit of the client computer 120 controls the entire client computer and/or the various units in the client computer. The processing unit can run various software including operating systems (OS), the application software and the printer driver software. In accordance with an exemplary embodiment, the processing unit produces a print job based on the image and/or document data using the printer driver software. Examples of the processing unit consistent with certain embodiments of the invention include, but are not limited to, a central processing unit (CPU) or a micro processing unit (MPU) with memory and software necessary for the processing.

Examples of printers 110 consistent with exemplary embodiments of the invention include, but are not limited to, a laser beam printer (LBP), an ink jet printer (IJP), a thermal printer (e.g., a dye sublimation printer) and a silver halide printer. The printer 110 may be a so called multi-function peripheral in which a document scanning function, a print function, and a copy function are included. The printer 110 can be a color printer or a black and white (B/W) printer. In accordance with an exemplary embodiment, the printer 110 includes a processing unit, a print unit, and a transmit unit. The printer 110 is configured to interpret the print job sent from the client computer 130, and to print images based on thus interpreted print job.

Figure 2:
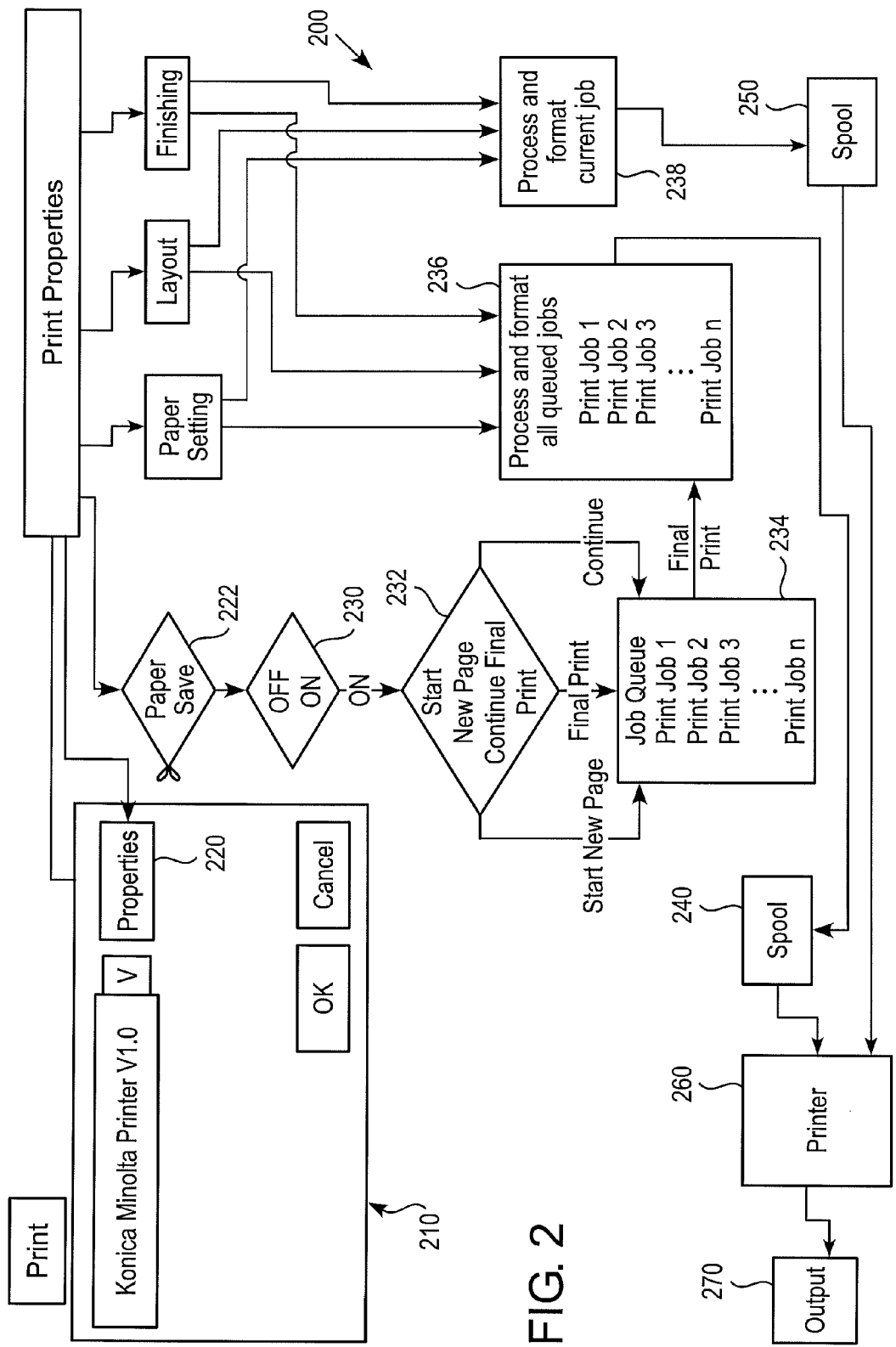
FIG. 2 is a schematic illustration of a system for stacking print jobs before final printing in accordance with an exemplary embodiment.

FIG. 2 is a schematic illustration of a system 200 for stacking print jobs before final printing in accordance with an exemplary embodiment. As shown in FIG. 2, the system 200 includes a printer driver user interface 210, which includes a plurality of print or printer properties 220, at least one printer spool or spooling device 240, 250, a printer or image forming unit 260, and an output 270. The print or printer properties 220 preferably include a continuous print mode (i.e., print stacking mode or paper save mode) 222. The output 270 is preferably in the form of at least one sheet of paper or other suitable printable medium (not shown), which has an image or images produced by the printer or image forming unit 260.

In accordance with an exemplary embodiment, the continuous print mode (or print stacking mode or paper save mode) 222 is preferably a print property option, which can be selected via the printer driver user interface 210. The continuous print mode (or print stacking mode) 222 preferably includes an on/off feature, which when selected 230 (i.e., in the "on" position or mode) stacks at least two print jobs, which have been registered within a print job queue 234. The at least two print jobs are subsequently processed and printed as a single combined print job upon final printing.

Figure 5:
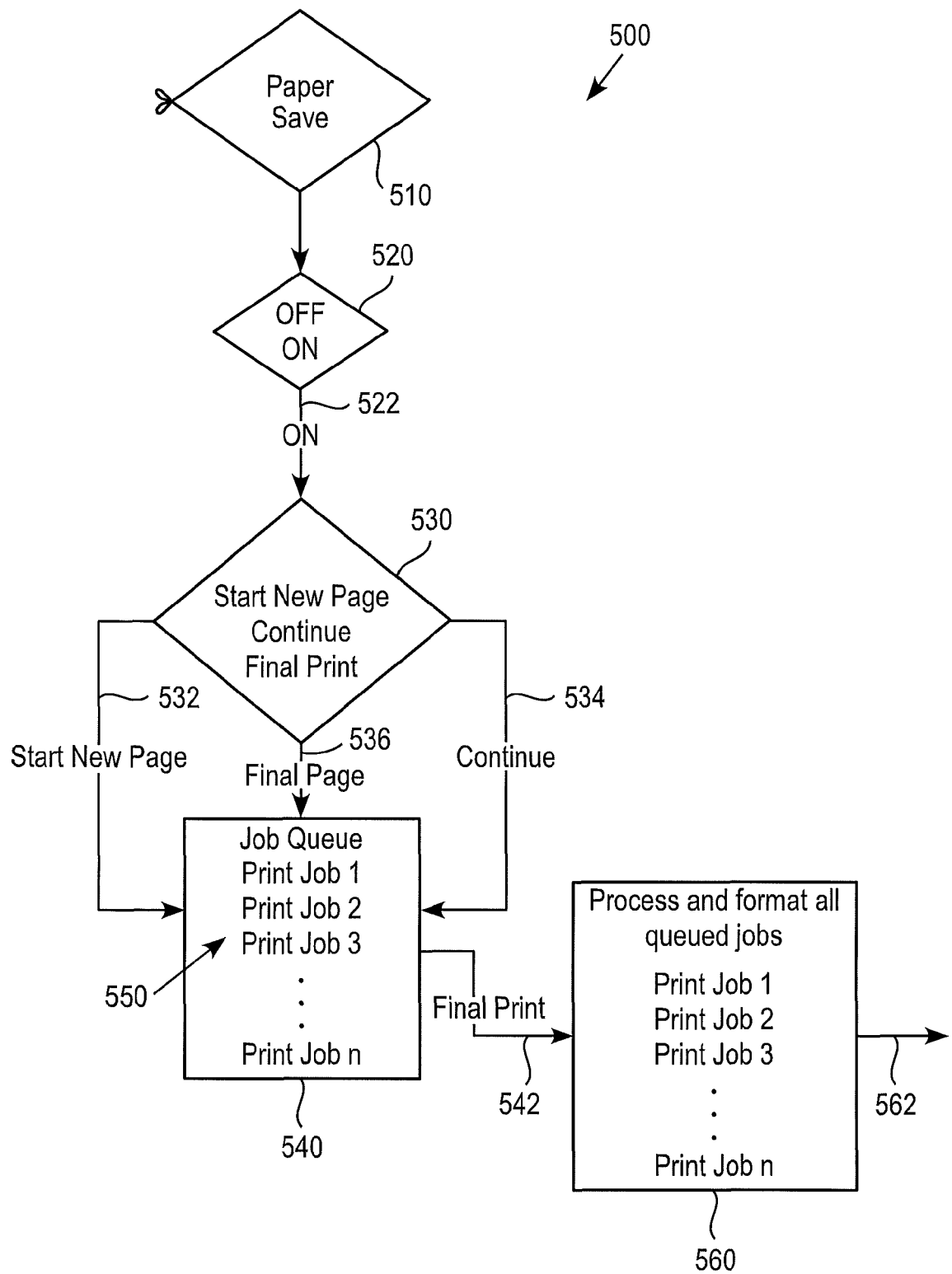
FIG. 5 is an illustration of a flow chart showing a system for stacking print jobs before final printing in accordance with an exemplary embodiment.

In accordance with an exemplary embodiment, the continuous print mode (or print stacking mode) 222 involves a print format mode 232, the print job queue 234 and a processor 236 for processing and formatting all registered (or queued) jobs upon the selection of a final print command, which is described in more detail and shown in FIG. 5. Upon completion of the processing and formatting each of the stacked (or queued) print jobs, the final print job is sent to a spool (or spooling device) 240, 250, where the final print job is stored on a buffer (usually an area on a disk) by a processor (not shown) and retrieved and printed by the image forming unit or printer 260 at its own rate. It can be appreciated that in accordance with an exemplary embodiment, spooler software or print management software can allow priorities to be assigned to print jobs, notify users when they have printed, distribute print jobs among several printers, allow stationery to be changed or select it automatically, generate banner pages to identify and separate print jobs, etc.

If the continuous print mode (or print stacking mode) 222 is not selected (i.e., placed in the "off" position or mode), the print job is processed and formatted 238 in accordance with the print properties 220, which have been selected, and sent to a spool or spooling device 240 and printer 250 as described above. It can be appreciated that in the "off" mode, each print job is printed separately beginning on the top of each new sheet of paper or print medium.

Figure 3:
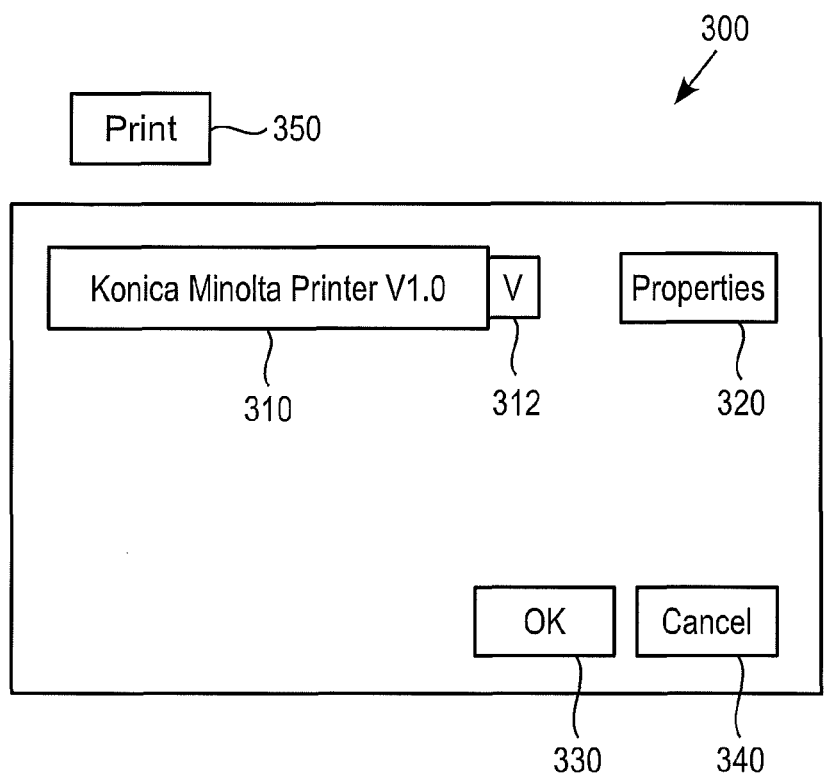
FIG. 3 is an illustration of a printer driver user interface in accordance with an exemplary embodiment.
Figure 4:
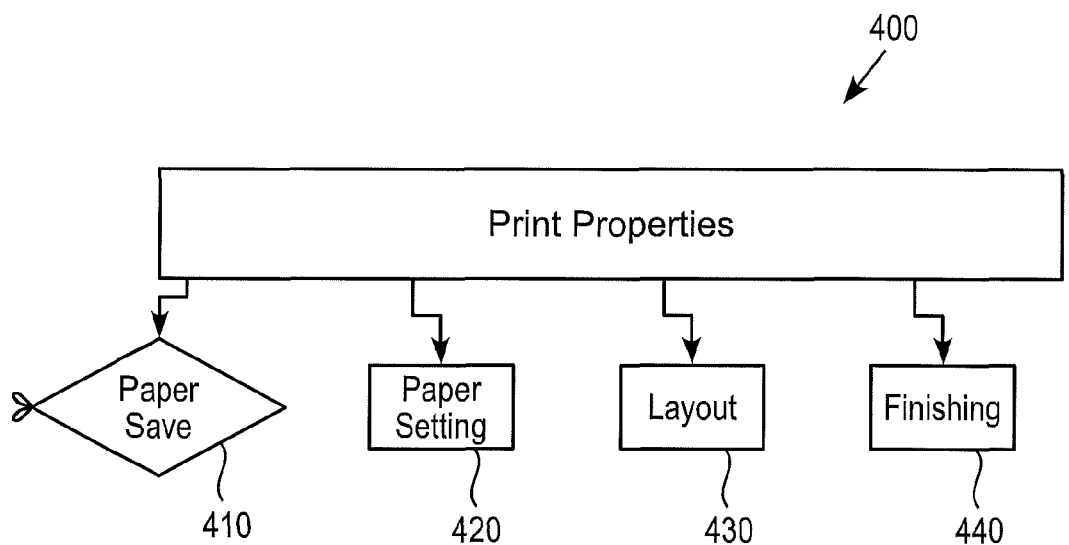
FIG. 4 is an illustration of print properties as shown in a printer user interface in accordance with another embodiment.

As shown in FIG. 3, the printer driver user interface 300 includes a plurality of selections or windows including a printer selection window 310 (i.e., Konica Minolta Printer V1.0) with a pull down menu 312 to select a printer from a list of printers, a print properties button 320, an approval or "OK" selection button 330 and a "Cancel" selection button 340. In accordance with an exemplary embodiment, some of the print properties 320 can also be included on the initial printer driver user interface 300, or alternatively as shown in FIG. 4, on a separate printer driver user interface screen. It can be appreciated that the printer driver user interface 300 in connection with the printer driver or a print processor is a piece of software that converts the data to be printed to the form specific to a printer. The printer driver allows applications to print without being aware of the technical details of each printer model. The printer driver user interface 300 can also include a print button 350. Alternatively, the print button 350 or print command can be initiated or accessible through toolbars, key strokes and/or other methods.

In accordance with an exemplary embodiment as shown in FIG. 3, the printer selection window 310, the print properties button 320, the approval or "OK" button 330, the "Cancel" button 340 and the print button 350 are preferably controlled through the use of a cursor via a mouse and/or keyboard. In accordance with an alternative embodiment, the printer window 310, print properties button 320, the approval or "OK" button 330, the "Cancel" button 340, and the print button 350 can be controlled via touch screen technology, which can detect the presence and location of a touch within the display area to change the paper size, change the layout of the image, and to initiate and/or start the printing process.

As shown in FIG. 4, the print properties 400 can include a continuous print mode (or print job stacking mode) 410, paper settings 420, layout or layout settings 430, and finishing or finishing settings 440. It can be appreciated that the paper settings 420 can include the number of copies to be made, the orientation of paper (portrait or landscape), information on collate printing, information on offset printing, the original paper size, the output paper size, the paper type, and paper source information, such as tray numbers. Layout settings 430 can include settings concerning the print layout. The finishing settings 440 can specify paper finishing settings, including the paper binding options, such as stitch, staple, and punch.

FIG. 5 is an illustration of a flow chart showing a system 500 for stacking print jobs before final printing in accordance with an exemplary embodiment. In accordance with an exemplary embodiment, when a plurality of print jobs are to be printed in a continuous print mode (or stack printing mode), the process is preferably initiated by software as a part of a printer driver, or alternatively, as a part of an application program that handles images. The driver user interface 210 preferably includes a print properties button 320, which provides the user with a plurality of print properties including the continuous print mode (or stack printing mode) 510. The optional continuous print mode (or stack printing mode) includes an "on" or "off" section button (or mode) 520. If the stack print mode 520 is placed in the "off" position or mode, the print job is processed and formatted and sent to the spooling device 240 and printer 260 for printing, wherein each print job starts on a new page.

Alternatively, if the continuous print mode 520 is selected (i.e., placed in the "on" position or mode), the printer driver is configured to accommodate a plurality of print jobs and join or combine them into a single print job. In accordance with an exemplary embodiment, a first print job (or first document) can be registered to be printed through the printer driver, and a second print job (or second document) can be registered to be printed through the printer driver, and dispatched or sent to an intended printer as a single print job. In accordance with a preferred embodiment, the leading image of the second document (i.e., Print Job 2) can start on the same page as the last image on the first document (i.e., Print Job 1).

As shown in FIG. 5, if the continuous print mode (or stack print mode) 520 is selected and placed in the "on" position or mode, the print job is sent 522 to a printing stacking formatting selection step 530, wherein the user can select one of three options: (1) "Start New Page" command 532; (2) "Continue" command 534; or (3) "Final Print" command 536. In the "Start New Page" command 532, the new print job 550 is sent to a print job queue (or job queue) 540, wherein each of the at least two print jobs 550 are registered and stacked (or held) until the "Final Print" command 536 is received by the printer driver. The "Start New Page" command 532 provides instructions to the printer driver (printer application or printer application firmware) that a new print job has been added (e.g., Print Job 2) to the job queue 540, and the new print job (e.g. Print Job 2) should start at the top or an upper portion of a new sheet of paper or other suitable print medium upon receipt of the "Final Print" command 536.

Alternatively, the user can select the "Continue" command 534, wherein the new print job 550 (e.g., Print Job 3) is added to the job queue 540, and upon receipt of the "Final Print" command 536, the new print job (Print Job 3) will appended to a blank area that remains or is left over from the end of the previous print job (i.e., Print Job 2). For example, the leading image of the new document (i.e., Print Job 3) can start on the same page as the last image on the previous document (i.e., Print Job 2).

After each of the print jobs 550 has been added to the job queue 540, the user sends the "Final Print" command 536 to the job queue 540, which instructs the job queue 540 to forward 542 the at least two print jobs (or plurality of print jobs) 550 (i.e., Print Job 1, Print Job 2, Print Job 3, . . . Print Job n) to the processor 560 for processing and formatting. Each of the print jobs 550 (i.e., Print Jobs 1-$n$) are processed and formatted in accordance with the formatting instructions provided during registration or placement of the print jobs 550 (Print Jobs 1-$n$) into the job queue 540. The formatted print job 562 is then sent to the spooling device or spool 250 (FIG. 2) to be held until the printer 260 is ready to print the job into the desired output 270.

It can be appreciated that in accordance with another exemplary embodiment, the print jobs 550 can be placed in the job queue 540 from one and/or multiple applications and is not limited to a single application. For example, a user can combine a first print job (e.g., Print Job 1) from an e-mail and a second print job (e.g., Print Job 2) from a web-based application, and the job queue 540 will stack the two print jobs 550 until the final print command 536 (i.e., "print stack jobs") is received. Upon receiving the final print command 536, the system and method 500 prints the at least two print jobs 550 in a desired final print format as fully set forth herein.

In addition, it can be appreciated that the final print format of the at least two print jobs 550 can include (1) appending a new or subsequent print job (e.g., Print Job 2) to the blank area that is left from the previous or prior print job (e.g., Print Job 1); (2) starting the new or subsequent print job (Print Job 2) on a new sheet of paper or medium; (3) starting the new or subsequent print job (Print Job 2) on the blank (or back side of a sheet of paper) that is left from the previous or prior print job (Print Job 1); and/or (4) any combination thereof.

In accordance with an exemplary embodiment, it can be appreciated that the print jobs 550 remain on the print driver on the client side (i.e., computer) without being processed. In addition, it can be appreciated that the method and systems as described herein can be implemented into any application with printing capabilities, any printer languages, and/or any and all types of printers.

It also can be appreciated that different print jobs from the same or different applications can be appended to the same page of the next line of the sheet of paper and/or print medium and/or appended on the back side of a duplex output (two-sided printout). It can be appreciated that duplex printing is typically performed by printing on a first surface of a sheet of paper or printable medium, turning over the sheet of paper or printable medium, and performing printing on a second surface of the sheet of paper or printable medium.

An example of a configuration setting using a Printer Job Language (PJL) format to insert the continuous print mode or print stacking made into a printer driver program is set forth below. When the print jobs are in a hold mode, the configuration setting can include the following additional syntax or print commands:

```
@PJL SET PAPERSAVE = ON
@PJL SET CONTINUEPRINT = YES
@PJL SET FINALPRINT = NO
```

Alternatively, when the final print command is sent, the syntax or print commands can read as follows:

```
@PJL SET PAPERSAVE = ON
@PJL SET CONTINUEPRINT = YES
@PJL SET FINALPRINT = YES
```

In accordance with another exemplary embodiment, a computer readable medium is disclosed containing a computer program for creating a print job, which includes executable instructions for activating a continuous print mode from a list of print properties within a printer driver user interface, wherein the continuous print mode stacks at least two print jobs in a print job queue until instructed to print; sending at least two print jobs to the print job queue; selecting a final print format for each of the at least two print jobs within the print job queue; processing and formatting each of the at least two print jobs into a single combined print job; and printing the single combined print job.

In accordance with an exemplary embodiment, the method and system includes a driver user interface application having a continuous print mode, and wherein the continuous print mode stacks at least two print jobs in a print job queue until instructed to print. It can be appreciated that methods may be implemented by software as a part of a printer driver or a part of an application program that handles images.

The invention is directed to both the method and an apparatus, such as a printer or computer, which implements the method by executing a program stored in a non-volatile memory, such as a read only memory (ROM). The method may be introduced into the apparatus by updating the firmware in the non-volatile memory. In this regard, the method may be brought to the apparatus in a form of a package of install software and the firmware, which may be divided and/or compressed so that the install software effectively installs the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if embodiment of the present invention is combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for producing continuous print jobs comprising:
   a printing unit which prints an image; and
   a client computer having executable instructions for creating a print job for producing a continuous print job, the instructions comprising:
      activating a continuous print mode from a list of print properties within a printer driver user interface, and wherein the continuous print mode stacks at least three print jobs in a print job queue until instructed to print;
      sending the at least three print jobs to the print job queue;
      selecting a final print format for each of the at least three print jobs, the final print format for each of the at least three print jobs includes independently selecting for each subsequent print job of the at least three print jobs, a start new page command, wherein the subsequent print job starts on a new sheet of print medium, or a continue command, wherein the subsequent print job is appended to a previous print job, and wherein the selecting of the final print format for each of the at least three print jobs comprises:
         selecting at least one start new page command for at least one of the at least three print jobs; and
         selecting at least one continue command for at least one remaining print job of the at least three print jobs;
      processing and formatting each of the at least three print jobs into a single combined print job; and
      printing the single combined print job on the printing unit.

2. The system of claim 1, further comprising a processor within the client computer, which processes and formats each of the at least three print jobs into the single combined print job.

3. The system of claim 1, wherein the single combined print job comprises a leading image of at least one of the three print jobs starting on a same page as a last image of one of the other print jobs.

4. The system of claim 1, wherein the single combined print job comprises starting at least one of the at least three print jobs on a blank side of a sheet of one of the other print jobs.

5. The system of claim 1, wherein at least one of the at least three print jobs is from a first application, and wherein at least one of the other print jobs is from a second application, which is different than the first application.

6. The system of claim 1, further comprising a spooling device within the printing unit, which receives the single combined print job from the client computer.

7. A method for stacking print jobs, the method comprising:
   sending at least three print jobs to a print job queue;
   selecting a final print format for each of the at least three print jobs, the final print format for each of the at least three print jobs includes independently selecting for each subsequent print job of the at least three print jobs, a start new page command, wherein the subsequent print job starts on a new sheet of print medium, or a continue command, wherein the subsequent print job is appended to a previous print job, and wherein the selecting of the final print format for each of the at least three print jobs comprises:
      selecting at least one start new page command for at least one of the at least three print jobs; and selecting at least one continue command for at least one remaining print job of the at least three print lobs;

processing and formatting each of the at least three print jobs into a single combined print job; and printing the single combined print job.

8. The method of claim 7, further comprising activating a continuous print mode from a list of print properties within a printer driver user interface, and wherein the continuous print mode stacks at least three print jobs into a print job queue until instructed to print.

9. The method of claim 7, wherein the step of processing and formatting each of the at least three print jobs into the single combined print job is performed within a client device.

10. The method of claim 7, further comprising sending the single combined print job to a printing unit via a network.

11. The method of claim 7, wherein the single combined print job comprises a leading image of at least one of the three print jobs starting on a same page as a last image of one of the other print jobs.

12. The method of claim 7, wherein the single combined print job comprises starting at least one of the at least three print jobs on a blank side of one of the other print jobs.

13. The method of claim 7, wherein at least one of the at least three print jobs is from a first application, and wherein at least one of the other print jobs is from a second application, which is different than the first application.

14. A non-transitory computer readable storage medium containing a computer program for creating a print job, wherein the computer program comprises computer executable instructions for:

activating a continuous print mode from a list of print properties within a printer driver user interface, and wherein the continuous print mode stacks at least three print jobs in a print job queue until instructed to print;

sending the at least three print jobs to the print job queue;

selecting a final print format for each of the at least three print jobs, the final print format for each of the at least three print jobs includes independently selecting for each subsequent print job of the at least three print jobs, a start new page command, wherein the subsequent print job starts on a new sheet of print medium, or a continue command, wherein the subsequent print job is appended to a previous print job, and wherein the selecting of the final print format for each of the at least three print jobs comprises:

selecting at least one start new page command for at least one of the at least three print jobs; and selecting at least one continue command for at least one remaining print job of the at least three print jobs;

processing and formatting each of the at least three print jobs into a single combined print job; and printing the single combined print job.

15. The computer readable storage medium of claim 14, further comprising processing and formatting each of the at least three print jobs into the single combined print job within a client device.

16. The computer readable storage medium of claim 15, further comprising sending the single combined print job to a printing unit via a network.

17. The computer readable storage medium of claim 14, wherein the single combined print job comprises appending at least one of the at least three print jobs to a blank area left from one of the other print jobs.

18. The computer readable storage medium of claim 14, wherein the single combined print job comprises starting at least one of the at least three print jobs on a blank side of one of the other print jobs.

19. The computer readable storage medium of claim 14, wherein at least one of the at least three print jobs is from a first application, and wherein at least one of the other print jobs is from a second application, which is different than the first application.

\* \* \* \* \*